United States Patent [19]

Weinberger et al.

[11] Patent Number: 4,995,055
[45] Date of Patent: Feb. 19, 1991

[54] TIME SHARED VERY SMALL APERTURE SATELLITE TERMINALS

[75] Inventors: Howard L. Weinberger, Marina del Rey; Jamal Sarraf, Irvine, both of Calif.

[73] Assignee: Hughes Aircraft Company, Los Angeles, Calif.

[21] Appl. No.: 207,425

[22] Filed: Jun. 16, 1988

[51] Int. Cl.$^5$ .......................................... H04L 27/04
[52] U.S. Cl. ......................................... 375/5; 375/59; 455/91
[58] Field of Search .................... 375/5, 62, 59, 60; 455/58, 59, 60, 91; 340/825.08

[56] References Cited

U.S. PATENT DOCUMENTS

| | | | |
|---|---|---|---|
| 3,310,742 | 11/1963 | Adams | 455/59 |
| 3,823,375 | 7/1974 | Wycoff | 455/58 |
| 3,922,497 | 11/1978 | Artom et al. | 370/61 |
| 4,025,855 | 5/1977 | Atkinson | 455/91 |
| 4,131,849 | 12/1978 | Freeburg et al. | 455/58 |
| 4,247,947 | 1/1981 | Miyamoto | 455/58 |
| 4,262,355 | 4/1981 | Schiff | 370/69.1 |
| 4,338,579 | 7/1982 | Rhodes | 375/62 |
| 4,352,201 | 9/1982 | Miller | 455/58 |
| 4,418,416 | 11/1983 | Lese et al. | 375/5 |
| 4,481,489 | 11/1984 | Kurby | 375/65 |

Primary Examiner—Benedict V. Safourek
Assistant Examiner—Stephen Chin
Attorney, Agent, or Firm—Robert A. Westerlund; Steven M. Mitchell; Wanda K. Denson-Low

[57] ABSTRACT

A time shared power amplifier for amplifying first and second modulated carrier signals for transmission. The carrier signals are modulated by first and second data signals, respectively. The first and second signals are characterized by bursts of data separated by periods of silence. If either of the data signals is presented for transmission while the other is being transmitted, the later one is stored in a storage buffer until the earlier one has been transmitted. Thus, each signal is transmitted during the other's silent periods, and since only one carrier is being transmitted at any given time a much smaller amplifier can be used to amplify the carriers to a given power level than would be required if both carriers had to be transmitted at once.

10 Claims, 4 Drawing Sheets

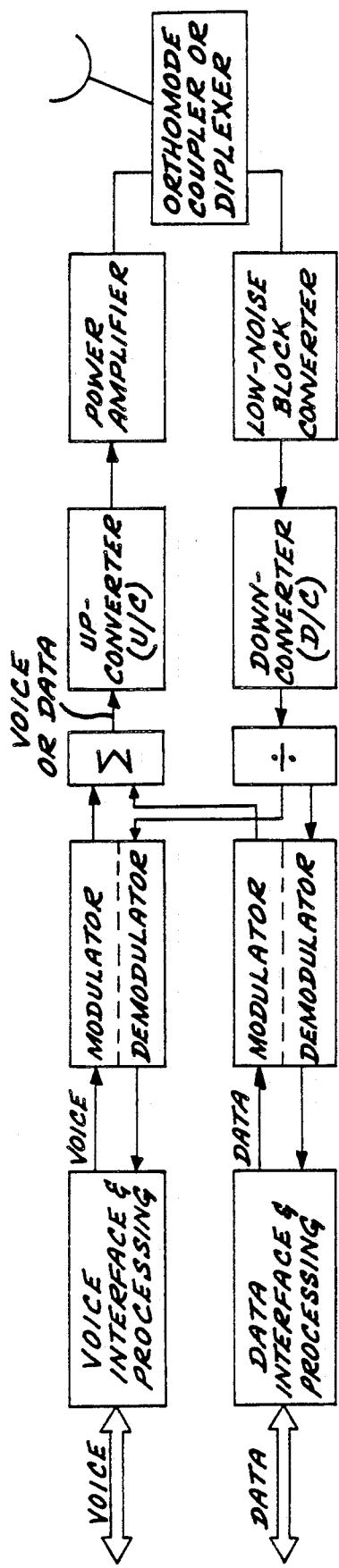
FIG. 1 PRIOR ART VSAT BLOCK DIAGRAM
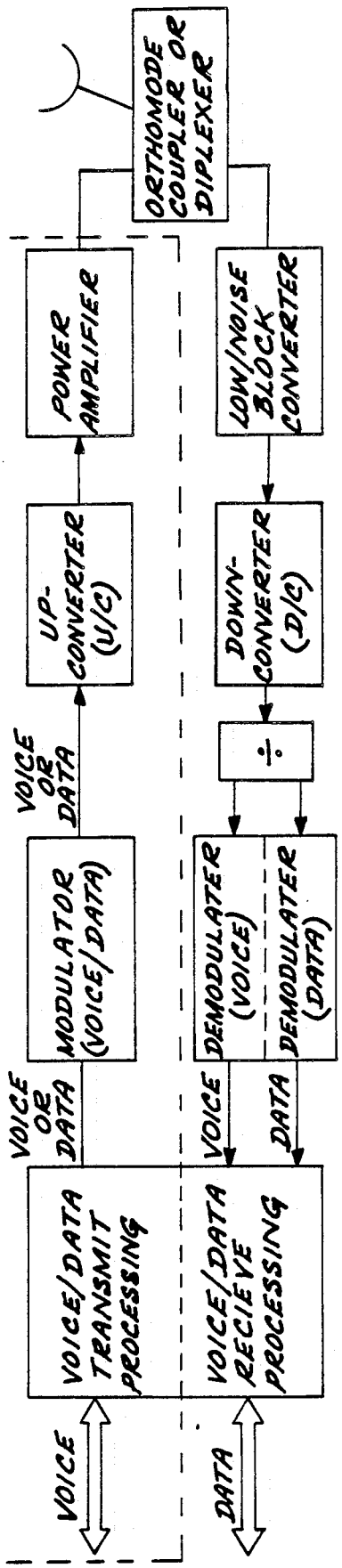
FIG. 2 TIME SHARED VSAT BLOCK DIAGRAM

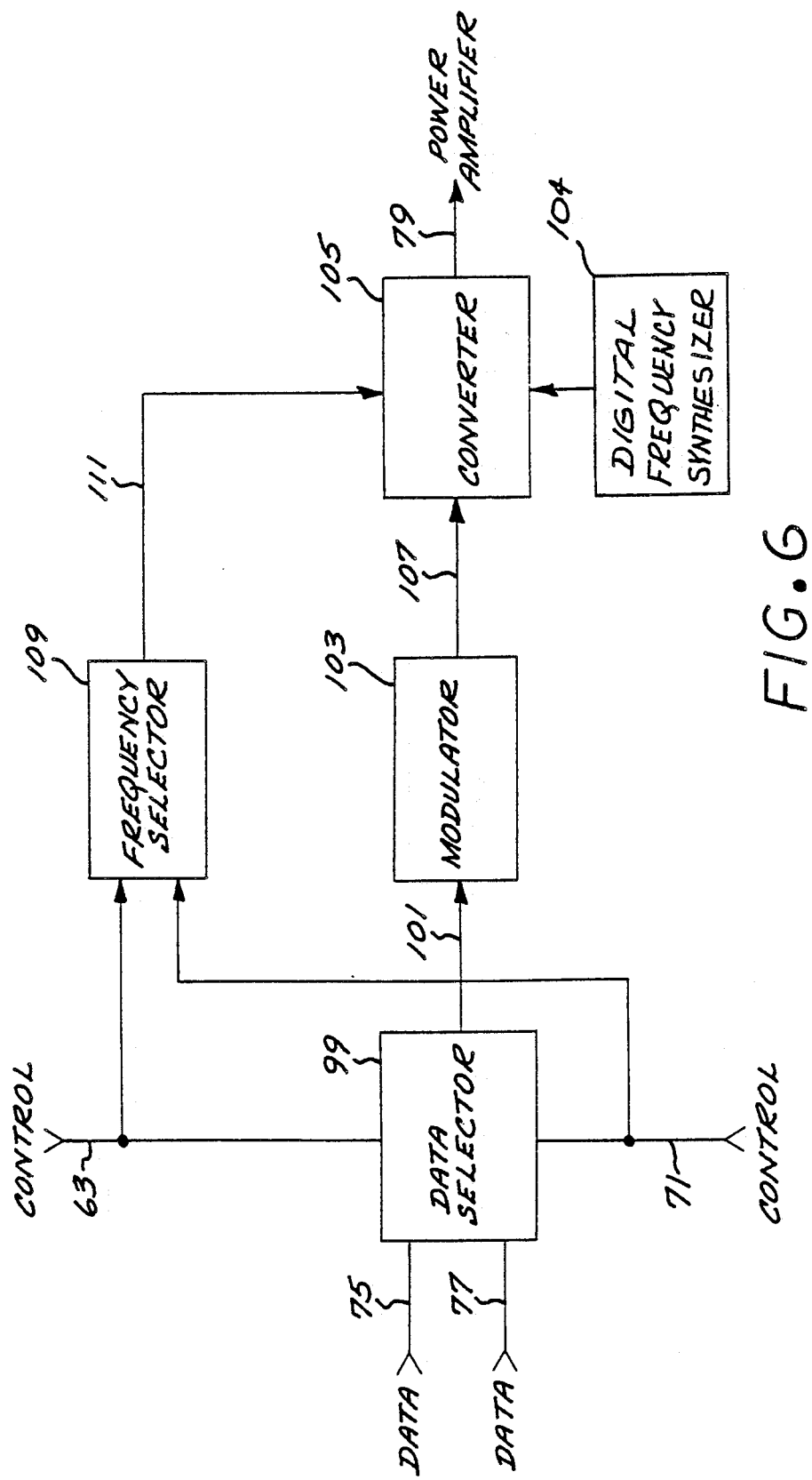

TIME SHARED VERY SMALL APERTURE SATELLITE TERMINALS

BACKGROUND OF THE INVENTION

1. Field of The Invention

This invention is in the general field of radio transmitter power amplifiers for satellite communications, and more particularly in the field of voice and communications power amplifiers which simultaneously amplify for transmission two different signals on different carrier frequencies for communication via very small aperture terminals.

2. Description of the Related Art

It is often necessary to transmit two different data signals by means of a single transmitter. For example, an earth station for transmitting information from a remote computer terminal to a central computer via satellite must at various times transmit voice and computer data signals. Each data signal must be transmitted on a different carrier frequency, and a power amplifier for use in such a transmitter must be capable of amplifying a carrier signal of either frequency to a sufficient level of power for transmission.

One application for transmitters of this type is satellite communication terminals in which concurrent communications of voice and data is desired. It is highly desireable that the transmitter be co-located with each antenna at a user site to reduce the overall cost of such systems. However, such use places severe demands on the complexity, cost and performance of such systems.

For instance, if both voice and computer data signals are ready for transmission at the same time, the power amplifier must simultaneously amplify a carrier signal carrying the computer data signal and a carrier signal carrying the voice signal to a sufficient level of power for transmission. If the required power level is the same for each carrier signal, the amplifier must be able to provide a total power output of twice the maximum power which would have been required to transmit either carrier signal alone, a difference of three dB.

Moreover, when two carrier signals are being amplified simultaneously it is necessary to operate the amplifier some three to six dB below its maximum power level in order to avoid unacceptable intermodulation distortion between the two signals. Accordingly, a power amplifier which can simulataneously amplify two different carrier signals to a required level of power must have a maximum power rating six to nine dB higher than would be required to amplify only one signal to the same power level.

The power amplifier represents a significant part of the cost of a transmitter and, in a relatively small installation such as an earth station for a remote computer terminal, may represent a major fraction of the cost of the entire station. If it were possible to transmit both voice and computer data carrier signals by means of a power amplifier no more powerful than would be required to transmit only one signal, significant cost savings and increased efficiency of operation could be achieved.

Accordingly, there is a need for a way to transmit two different carrier signals, each carrying different data signals such as voice and computer data, without using a power amplifier more powerful than would be needed to transmit one such signal by itself.

SUMMARY OF THE INVENTION

This invention particularly relates to the field of voice and data communication via very small aperture terminals (VSATs), but is of general utility to a variety of satellite communication systems. Through this invention, a single transmitter equipment is made to function as the equivalent of two such systems supporting concurrent communications of voice and data, thus substantially reducing the cost of such services.

In the newly developed field of Ku-band satellite communications, very small aperture terminals (VSATs) are installed directly on the customer premises to reduce the overall cost of a communications system. Such terminals are usually required to support one voice and one data channel concurrently. With different destinations for each circuit, the terminal has to generate and transmit two independent carriers, one for voice and one for the data channel. This, in effect, requires the equivalent of two transmitters, although some components may be combined where practical to save costs.

In the transmit direction, the two carrier signals share a common up-converter and a common power amplifier. While this does not impose too much burden on the up-converter, the implications for the power amplifier are substantial. These implications are due to the fact that a power amplifier, which has to simultaneously amplify two different carrier signals to a required level of power, must have a maximum power rating of six to nine dB higher than that required to amplify only one signal to the same power level.

The power amplifier portion of a VSAT represents about 20% of the total VSAT cost and each of the modems represents about 25% of the cost. Since the total cost of a VSAT has a great bearing on the final cost of the communications services to the end users, any reduction of the number of subsystems or lowering of the design performance requirements of the major components of the VSAT would result in substantial savings in VSAT-based communications networks.

The present invention uses the concept of time sharing and makes it possible for each of the voice and computer data signals at a VSAT to share one modulator (instead of each channel having a dedicated modulator) and thereby requires the transmission of only one RF carrier signal at any instant. Also, since the system of the present invention only requires the up-conversion and amplification of one carrier signal, instead of two in the traditional situation, substantial reductions in the required amplifier power rating (on the order of six to nine dB) is possible. Thus, by use of the present invention it is estimated that the cost of the amplifier may be cut at least in half. The overall cost reduction in the VSAT system as a result of the present invention could thus easily reach 25% or more.

The present invention resides in a time shared power amplifier which amplifies two different carrier signals, each carrying different data signals, to a power level equal to that to which a conventional amplifier having similar powerhandling capability could amplify a single carrier signal.

A time shared power amplifier embodying the invention includes first and second data storage means, control means to initiate transfer of stored data signals out of the storage means, modulation means to provide a carrier signal modulated with any stored data signals out of the storage means, modulation means to provide a carrier signal modulated with any stored data signal being transferred out of either storage means, and a power amplifier to amplify the modulated carrier signal. The carrier signal has a first frequency when modulated with a signal from the first storage means and a second frequency when modulated with a signal from the second storage means.

While a signal is being transferred out of the first storage means, initiation of any transfer of signals out of the second storage means is inhibited. Similarly, while a signal is being transferred out of the second storage means, initiation of any transfer of signals out of the first storage means is inhibited. The power amplifier is never called on to amplify more than one carrier signal at any one time because only one data signal can be transferred out of store at a time and therefore only one modulated carrier signal can be provided at a time. The storage means may comprise first-in, first-out serial storage means. Conversion means may be provided to convert an analog signal into digital form. Means may be provided to sense the presence of a signal and to cause one of the data storage means to store the sensed signal.

The modulation means may comprise two separate modulators, each with its own carrier signal generator, and means to prevent the amplifier from receiving more than one carrier signal at a time. Alternatively, the modulation means may comprise a single modulator and a carrier signal generator which provides a carrier signal having a first frequency when being modulated with a data signal from the first storage means and a second frequency when being modulated with a data signal from the second storage means. In another embodiment, the modulation means may comprise means to modulate an intermediate signal with any data signal from either storage means and means to provide the carrier signal by shifting the frequency of the modulated intermediate signal to either of two desired frequencies according to whether the intermediate signal is being modulated with a data signal from the first storage means or from the second storage means. The carrier signal may be provided by a conventional oscillator, a digital frequency synthesizer, or other suitable frequency generation means.

In a time shared power amplifier according to the invention, any data signal being held in the second storage means for transmission must wait while any data signal already in the first storage means is being transmitted, and vice versa. In many applications, the first and second data signals occur in bursts sufficiently brief that any delays introduced by this time sharing will not have adverse effects. For example, speech bursts average about one second and packet data bursts average less than 0.1 second. Delaying a speech burst by 0.1 second would not be noticeable to the listener at the receiving end of the system. Similarly, delaying a data brust by one second would not adversely affect real-time transaction processing, which normally involves computer processing and transmission delays of several seconds. Thus, in such applications, a much smaller power amplifier can be used than would be required to transmit both data signals simultaneously, thereby imparting the benefits described above.

Other objects and advantages of the present invention will become apparent from the following detailed description taken together with the drawings which illustrate by way of example the principles and teachings of the invention.

BRIEF DESCRIPTION OF THE DRAWINGS

FIG. 1 is a block diagram of a voice-data VSAT according to the prior art.

FIG. 2 is a block diagram of the basic system of the present invention as applied to a VSAT system.

FIG. 6 is a block diagram of a second embodiment of the modulation means of FIG. 3 wherein a single modulator and an up-converter are employed.

DESCRIPTION OF THE PREFERRED EMBODIMENT

Figure 3:
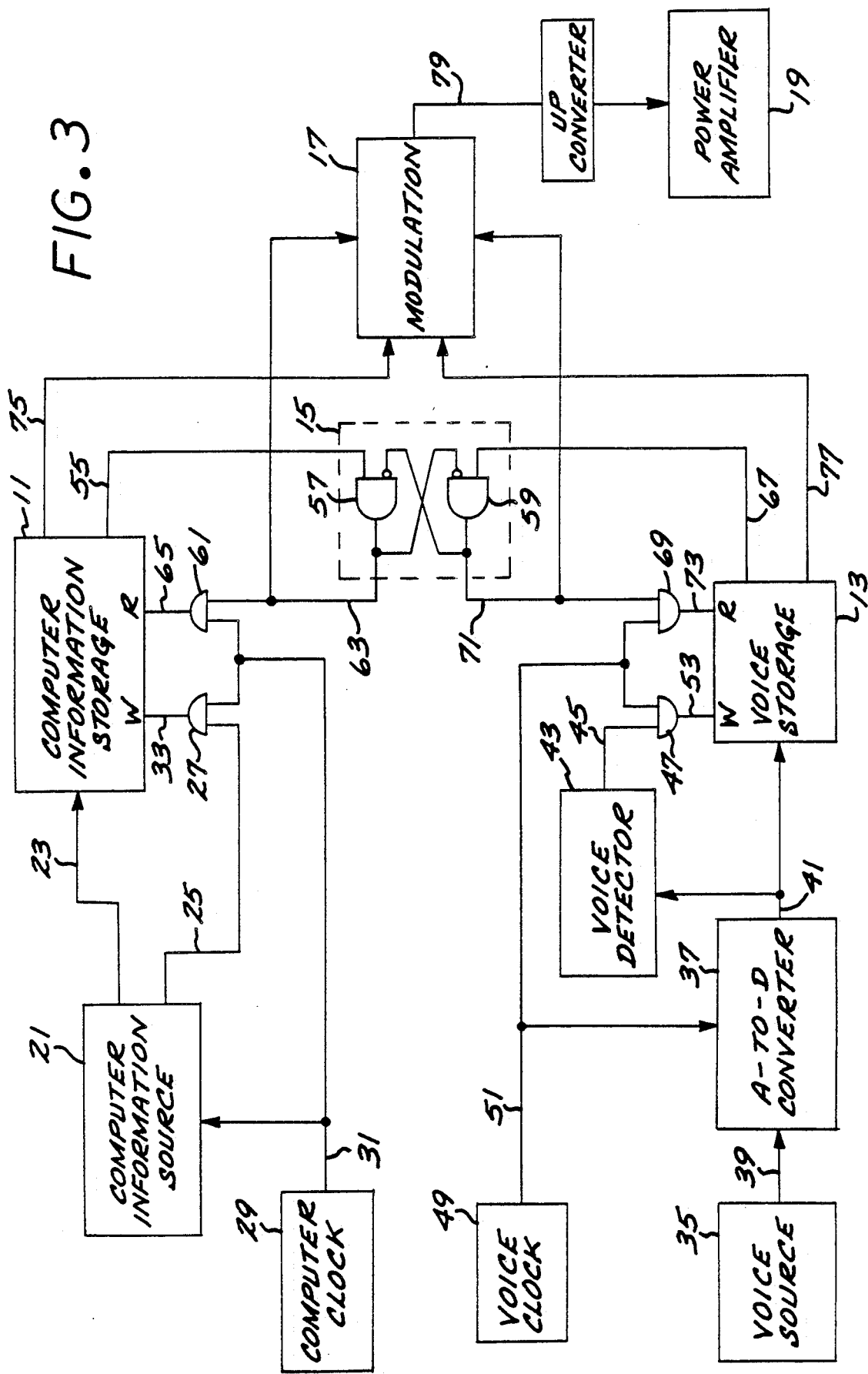
FIG. 3 is a more detailed block diagram of the general arrangement of the system providing input to the power amplifier according to the invention.

A time shared power amplifier according to the invention amplifies for transmission two carrier signals, each carrying different data signals, to a power level as great as the maximum power level to which a conventional amplifier could amplify a single carrier signal by separately amplifying each carrier signal when a data signal to be carried by that carrier signal is ready for transmission. If data to be carried by both carriers are ready for transmission at the same time, the data are transmitted sequentially rather than simultaneously. In order to provide for this eventuality, data or voice transmissions may be stored in memory until transmission capability is available.

It is often necessary to amplify and transmit two different radio carrier signals by means of a single power amplifier and transmitter. For example, an earth station which transmits information from a remote terminal to a central computer via satellite sends a voice signal on one carrier and a computer data signal on another. Simultaneous amplification of both signals to a given power level requires a power amplifier having a maximum power capacity as much as nine dB greater than would be required to amplify only one of the signals to the same power level.

A typical voice channel is quiet about 60% of the time, and its actual information content occurs in relatively short bursts of not more than a few seconds duration. A typical computer data channel is likewise silent more than half the time with its actual information content also occurring in relatively brief bursts. A time shared power amplifier according to the invention takes advantage of these silent periods by transmitting a burst of computer data when the voice channel is silent and a burst of voice data when the computer channel is silent. If computer data is presented for transmission while voice data is being sent, the computer data is held in temporary storage until the voice channel becomes quiet, and vice versa. Thus, only one carrier need be transmitted at any one time, and a much smaller and less expensive amplifier can be used than would be required to amplify both carriers simultaneously.

An example of a prior art VSAT system is illustrated in FIG. 1. As may be seen from the figure, the voice processing channel is entirely separate from the data interface and processing until the two are summed, prior to up-conversion, and input to the power amplifier. In the prior art system, the two carrier signals in the transmit direction share a common up-converter and a common power amplifier. The implications of this arrangement on the power amplifier are quite substantial, although other portions of the system such as the up-converter are not as drastically effected. Since the power amplifier in this arrangement has to simultaneously amplify two different carrier signals to an ouput required for transmission, the power amplifier must have a maximum power rating of approximately 6 to 9 dB greater power output than that which would be required to amplify a single signal at the same power level. Since the power amplifier for the VSAT system represents a substantial portion of the total cost of the system (typically about 20% of the cost of a VSAT system) and since the total cost of the VSAT has a substantial bearing on the total cost of a communication system due to a large number of VSATs used in such a system, any reduction in the cost of the VSAT subsystem will have a strong influence on the total cost of VSAT based satellite communications networks. The present invention thus provides an important improvement on the prior art systems of FIG. 1.

FIG. 2 illustrates a generalized block diagram of a VSAT according to the present invention which uses time sharing in the transmit direction. Time sharing is not desireable in the receive direction, since receive data is normally contained in a continuous transmission broadcast from a hub terminal to a number of VSATs. Thus, the primary savings and effienciences of the present invention are directed to the time sharing of transmission of voice and data information. The primary difference between the prior art systems of FIG. 1 and the present invention is related to the transmit interface and processing function, in that it switches the modulator input between the voice and data transmit interfaces to time share the output prior to up-conversion and input to the power amplifier. Thus, the separate voice and data interface processing of the prior art is replaced by an intergrated voice data processing block that differs in the transmit direction only and, as will be explained in more detail below, provides for the time sharing of voice and data information prior to input to the power amplifier. The following detailed description describes various preferred embodiments of the portion of the present invention indicated by the upper portion of this diagram enclosed in the dotted lines and representing the voice/data processing and amplification system.

A preferred embodiment of a time shared power amplifier as illustrated in FIG. 3 includes first data storage means 11 operative to store a first data signal; second data storage means 13, operative to store a second data signal; and control means 15, responsive to the first storage means 11 to initiate transfer of a stored data signal out of the first storage means 11 and during the transfer to inhibit initiation of transfer of any signal out of the second storage means 13, and responsive to the second storage means 13 to initiate transfer of a stored data signal out of the second storage means 13 and during the transfer to inhibit initiation of transfer of any signal out of the first storage means 11.

Also included is modulation means 17, operative to provide a carrier signal, to receive a data signal being transferred out of either storage means, and to modulate the carrier signal with the received data signal, the carrier signal having a frequency when modulated with a data signal from the first storage means 11 and a second frequency when modulated with a signal from the second storage means 13. A power amplifier 19 is operative to receive any modulated carrier signal from the modulation means and to amplify the same to a desired power level.

A time shared power amplifier according to the invention may be used, for example, in a remotely located earth station to transmit a computer data signal and a voice signal to a central location or perhaps to two locations. In such an application, the first storage means 11 may be adapted to receive and store the computer data signal and the second storage means 13 may be adapted to receive and store the voice signal.

More particularly, the first storage means 11 may comprise first-in, first-out serial storage means such as a serial shift register of random access memory. The storage means 11 receives the computer data signal from a computer source 21 through a line 23. The computer source 21 provides a control signal to indicate when it is ready to send a computer data signal to the storage means 11. This control signal is sent from the source 21 through a line 25 to a first input of an AND gate 27. A computer clock source 29 provides clock pulses to the computer source 21 and to a second input of the AND gate 27 through a line 31.

The control signal carried by the line 25 enables the AND gate 27. When the AND gate 27 is enabled, clock pulses from the clock source 29 pass from the AND gate 27 to a "write" input of the storage means 11 by a line 33, clocking the computer data signal from the source 21 into the storage means 11.

Similarly, the second storage means 13 receives the voice signal from a voice source 35. The voice source 35 provides a voice signal in analog form. Voice conversion means 37, such as an analog-to-digital converter, converts the analog voice signal into digital form for storage. The conversion means 37 receives the analog voice signal from the source 35 through a line 39 an provides the voice signal in digital form to the storage means 13 through a line 41.

Means 43 such as a voice detector senses the presence of a voice signal on the line 41 and causes the storage means 13 to store the sensed voice signal by providing a control signal through a line 45 to a first input of an AND gate 47. A voice clock source 49 provides clock pulses to the conversion means 37 and to a second input of the AND gate 47 through a line 51.

The control signal carried by the line 45 enables the AND gate 47. When the AND gate 47 is enabled, clock pulses from the voice clock source 49 pass from the AND gate 47 to a "write" input of the storage means 13 through a line 53, clocking the digital voice signal from the conversion means 37 into the storage means 13.

When a computer data signal has been stored in the storage means 11, the storage means 11 provides a "computer data ready" signal to the control means 15 through a line 55. The control means 15 may comprise, for example, logic such as first and second AND gates 57 and 59. The "computer data ready" signal carried by the line 55 is applied to a non-inverting input of the first AND gate 57. The "computer data ready" signal passes through the AND gate 57 and is applied to a first input of an AND gate 61 through a line 63, thereby enabling the gate 61. The gate 61 receives computer clock pulses from the computer clock source 29 through the line 31, and when the gate 61 has been enabled by the "computer data ready" signal it passes the clock pulses through a line 65 to a "read" input of the storage means 11 to clock the stored computer data signal out of the storage means 11.

Similarly, when a voice signal has been stored in the voice storage means 13, a "voice data ready" signal is provided to the control means 15 through a line 67. The "voice data ready" signal carried by the line 67 is applied to a non-inverting input of the second AND gate 59. The "voice data ready" signal passes through the AND gate 59 and is applied to a first input of an AND gate 69 through a line 71, thereby enabling the gate 69. The gate 69 receives voice clock pulses from the voice clock source 49 through the line 51, and when the gate 69 has been enabled by the "voice data ready" signal it passes the clock pulses through a line 73 to a "read" input of the storage means 13 to clock the stored voice signal out of the storage means 13.

The "computer data ready" signal from the AND gate 57 on the line 63 is applied to an inverting input of the gate 59. When present at this inverting input of the gate 59, the "computer data ready" signal inhibits any "voice data ready" signal from passing through the gate 59 and thereby prevents voice clock pulses from clocking any signal out of the storage means 13. Likewise, the "voice data ready" signal from the AND gate 59 on the line 71 is applied to an inverting input of the gate 57, and, when present at this inverting input of the gate 57, the "voice data ready" signal inhibits any "computer data ready" signal from passing through the gate 57 and thereby prevents computer clock pulses from clocking any signal out of the storage means 11.

Thus, if a computer data signal is ready for transmission prior to the time a voice signal is ready, the computer data signal gets transmitted first and, if a voice signal is ready for transmission at this time, the voice signal is kept in the storage means 13 until the computer data signal has been transmitted, and vice versa. Since computer data (e.g. transaction or packer data), and voice signals both occur in short bursts, neither signal ever has to wait very long to be transmitted.

The modulation means 17 receives a stored computer data signal from the storage means 11 through a line 75 and a stored voice signal from the storage means 13 through a line 77. The modulation means 17 provides a carrier signal modulated with any data signal being transferred out of either storage means, the carrier signal having a first frequency when modulated with a computer data signal from the storage means 11 and a second frequency when modulated with a voice signal from the storage means 13. The modulated carrier signal is provided to the power amplifier 19 through a line 79.

Figure 4:
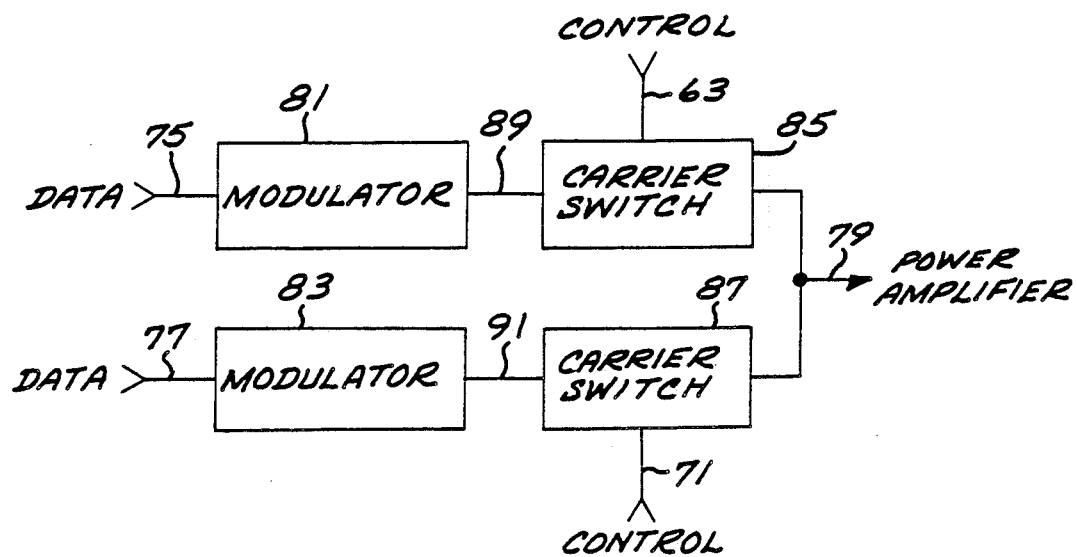
FIG. 4 is a block diagram of an embodiment of the modulation means of FIG. 3 wherein two separate modulators are employed.

In one embodiment, illustrated in FIG. 4, the modulation means 17 may comprise a first modulator 81, operative to provide a carrier signal having the first frequency and to modulate the same with a data signal being transferred out of the first storage means 11 through the line 75, and a second modulator 83, operative to provide a carrier signal having the second frequency and to modulate the same with a data signal being transferred out of the second storage means 13 through the line 77. Means to prevent the power amplifier 19 from receiving more than one of the carrier signals at any given time, such as first and second carrier switches 85 and 87, may also be provided. The first carrier switch 85 receives the modulated first carrier signal from the first modulator 81 through a line 89. The carrier switch 85 enables the modulated carrier signal to be provided to the power amplifier 19 through the line 79 only when the switch 85 is activated by a "computer data ready" signal carried by the line 63. Similarly, the second carrier switch 87 receives the modulated second carrier signal from the second modulator 83 through a line 91 and passes the same to the power amplifier 19 through the line 79 only when enabled by a "voice data ready" signal carried by the line 71.

Figure 5:
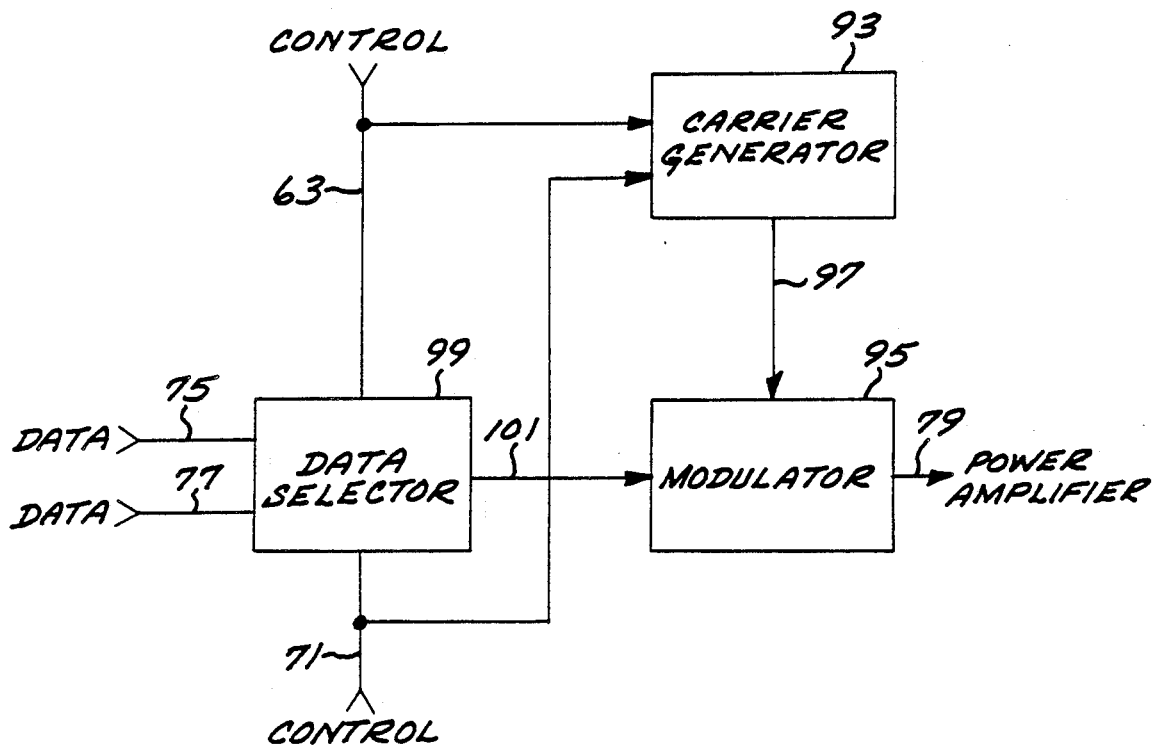
FIG. 5 is a block diagram of a first embodiment of the modulation means of FIG. 3 wherein a single modulator is employed.

In another embodiment, illustrated in FIG. 5, the modulation means 17 comprises a carrier generator 93, operative to provide a carrier signal having the first frequency when a data signal is being transferred from the first storage means 11, and the second frequency when a data signal is being transferred from the second storage means 13; and a modulator 95, operative to modulate the carrier signal with any data signal being transferred out of either storage means 11 or 13. The modulator 95 receives the carrier signal from the carrier generator 93 through a line 97. A data selector 99 may also be provided to select a data signal from one or the other of the storage means 11 or 13. The data signal as selected by the data selector 99 is provided to the modulator 95 through a line 101. The data selector and the carrier generator both receive the "computer data ready" and "voice data ready" signals through the lines 63 and 71, respectively. The data selector 99 may be omitted if the storage means 11 and 13 are equipped with tri-state outputs or with some other means to insure that neither will interfere with data being provided by the other at any time.

Another embodiment of the modulation means 17 is shown in FIG. 6. This embodiment comprises means such as a modulator 103 to generate an intermediate signal and modulate the same with any data signal being transferred out of either storage means; and means such as an up-converter 105 to provide the modulated carrier signal by shifting the frequency of the modulated intermediate signal to the first carrier frequency when the intermediate signal is being modulated with a data signal from the first storage means 11 and to the second carrier frequency when the intermediate signal is being modulated with a data signal from the second storage means 13. The up-converter 105 receives the modulated intermediate signal from the modulator 103 through a line 107. The modulator 103 receives the data signal from the data selector 99 as previously described through the line 101, or directly form the storage means 11 and 13 if a data selector is not used. A frequency selector 109 receives the "computer data ready" and "voice data ready" signals from the control means 15 through the lines 63 and 71, respectively, and selects the appropriate carrier frequency accordingly. The frequency selector 109 may comprise an oscillator which provides a signal to be combined with the intermediate signal in the up-converter 105 to produce the carrier signal, or it may comprise means to select a frequency control signal to be applied to the up-converter 105. In the latter case, the up-converter 105 includes frequency generation means such as, for example, a digital frequency synthesizer to provide a signal to be combined with the intermediate signal. The frequency selector signal is applied to the up-converter 105 from the frequency selector 109 through a line 111.

A time shared power amplifier according to the invention can amplify two different modulated carrier signals to a level of power equal to that to which a conventional amplifier could amplify a single modulated carrier signal. Two signals can thus be transmitted by a transmitter having no more power than would be required to transmit only one such signal, resulting in a significantly smaller, less expensive and more efficient transmitter than would otherwise be required.

Although certain specific embodiments of the invention have been disclosed, the scope of the invention is not to be limited to the particular forms and parts so described and illustrated. Accordingly, except as limited by the claims, the invention may be practiced otherwise than as specifically set forth herein.

What is claimed is:

1. A time shared power amplifier comprising:

first data storage means, operative to store a first data signal;

second data storage means, operative to store a second data signal;

control means, responsive to the first storage means to initiate transfer of a stored data signal out of the first storage means and during the transfer to inhibit initiation of transfer of any signal out of the second storage means, and responsive to the second storage means to initiate transfer of a stored data signal out of the second storage means and during the transfer to inhibit initiation of transfer of any signal out of the first storage means;

modulation means, operative to provide a carrier signal, to receive a data signal being transferred out of either storage means, and to modulate the carrier signal with the received data signal, said carrier signal comprising a first frequency when modulated with a data signal from said first storage means and a second frequency when modulated with a data signal from said second storage means; and a power amplifier, operative to receive any modulated carrier signal from the modulation means and to amplify the same to a desired power level.

2. A time shared power amplifier according to claim 1 wherein the modulation means further comprises:

means to generate an intermediate signal and to modulate the same with any data signal being transferred out of either storage means; and means to provide the carrier signal by shifting the frequency of the modulated intermediate signal to the first frequency when the intermediate signal is being modulated with a data signal from the first storage means and to the second frequency when the intermediate signal is being modulated with a data signal from the second storage means.

3. A time shared power amplifier according to claim 1 wherein the first data storage means comprises first-in, first-out serial storage means.

4. A time shared power amplifier according to claim 1 and further comprising conversion means to convert an analog signal into digital form for storage in one of the storage means.

5. A time shared power amplifier according to claim 1 and further comprising means to sense the presence of a data signal for storage and to cause one of the data storage means to store the sensed signal.

6. A time shared power amplifier according to claim 1 wherein the modulation means further comprises:

a first modulator, operative to provide a carrier signal having the first frequency and to modulate the same with a data signal being transferred out of the first storage means, and a second modulator, operative to provide a carrier signal having the second frequency and to modulate the same with a data signal being transferred out of the second storage means.

7. A time shared power amplifier according to claim 6 and further comprising means to prevent the amplifier from receiving more than one of the carrier signals at any given time.

8. A time shared power amplifier according to claim 1 wherein the modulation means further comprises:

a carrier generator, operative to provide a carrier signal having the first frequency when a data signal is being transferred from the first storage means and the second frequency when a data signal is being transferred from the second storage means; and a modulator, operative to modulate the carrier signal with any data signal being transferred out of either storage means.

9. A time shared power amplifier according to claim 8 wherein the carrier generator comprises a digital frequency synthesizer.

10. A time shared power amplifier according to claim 2 wherein the means to provide the carrier signal comprises a digital frequency synthesizer.

* * * * *